United States Patent

Lee

[11] Patent Number: 5,905,544
[45] Date of Patent: May 18, 1999

[54] METHOD FOR AUTOMATICALLY TURNING ON A SET TURNED OFF DUE TO POWER LINE NOISE

[75] Inventor: Sang-su Lee, Suwon, Rep. of Korea

[73] Assignee: Samsung Electronics Co., Ltd., Kyungki-do, Rep. of Korea

[21] Appl. No.: 08/127,519

[22] Filed: Sep. 28, 1993

[30] Foreign Application Priority Data

Sep. 28, 1993 [KR] Rep. of Korea ............... 92-17702

[51] Int. Cl.⁶ .................................................. H04N 5/63
[52] U.S. Cl. ..................... 348/730; 348/725; 365/229; 455/185.1
[58] Field of Search ............................ 358/188, 190, 358/903, 165; 455/185.1, 186.1; 365/229, 226, 228; 348/730; H04N 5/63

[56] References Cited

U.S. PATENT DOCUMENTS 4,641,190  2/1987  Testin et al. ....................... 358/165
4,750,040  6/1988  Hakamada ........................... 358/190

*Primary Examiner*—Sherrie Hsia
*Attorney, Agent, or Firm*—Sughrue, Mion, Zinn, Macpeak & Seas, PLLC

[57] ABSTRACT

In a microprocessor controlled television set, a method for automatically turning on the set which was turned off due to power line noise includes steps for determining when the set is turned off due to noise, storing first data indicative of a prior-to-turn-off state of the set when the set is turned off due to noise and comparing the first data with second data indicative of a turned-off state when noise is removed. As a result of the comparison step, when the fist and second data are the same, the set is automatically turned on. However, if the first and second data are different from one another, the set is re-initialized using the first data. According to one aspect of the invention, when the set is re-initialized, the set must be turned on using a key manipulation. Thus, the user does not need to turn on a set manually when the set has been turned off due to power line noise.

5 Claims, 4 Drawing Sheets

| –       | TV/VIDEO  | POWER       | –            |
|---------|-----------|-------------|--------------|
| 1       | 2         | 3           | VOL-UP       |
| 4       | 5         | 6           | VOL-DOWN     |
| 7       | 8         | 9           | MUTE         |
| CH-UP   | 0         | CH-DOWN     | WIDE CHANNEL |
| ERASE   | ENTER     | HELP        | FINE-UP      |
| MODE-UP | MODE-DOWN | MENU        | FINE-DOWN    |
| CHECK   | RECALL    | PICTURE     | CHECK        |
| PIC-STD | SND-STD   | AUTO MEMORY | FUNCTION     |

METHOD FOR AUTOMATICALLY TURNING ON A SET TURNED OFF DUE TO POWER LINE NOISE

BACKGROUND OF THE INVENTION

The present invention relates to a method for automatically turning on a set which has been turned off due to noise.

Generally speaking, a microprocessor executes timer functions according to a clock, operational functions and control functions, and searches a program stored in memory or data stored in registers which determine the conditions necessary for a specific control function. Such a microprocessor also swiftly and accurately controls the operation of an input means, a power control means, a display control means, an audio output means, etc.

In the electronic products or systems using a microprocessor as described above, if external or internal noise occurs, the system is in an unstable state, so that the microprocessor is latched up and, in exceptional cases, may be destroyed. That is, the system can be automatically turned off, independent of a power key.

Also, for the development of the synthetic fiber technology in modern times, synthetic fiber is widely used. However, a voltage spike ranging from several microvolts to several kilovolts may be induced by the synthetic fiber.

That is, if the system is influenced by the generation of static electricity or by thunder and tightening, the microprocessor controlling the system is also affected, thereby causing fatal errors or the misoperative execution of the desired function.

SUMMARY OF THE INVENTION

Accordingly, it is an object of the present invention to provide a method for automatically turning on a set turned off due to noise, wherein if the set is turned off due to noise, the set is turned on in a prior-to-turn-off state or an initialized state.

To achieve the above object of the present invention, there is provided a method for automatically turning on a set turned off due to noise in the electronic products using a microprocessor, the method comprising the steps of:

(a) determining if a set is turned off due to noise;

(b) storing representative data representing the information data of a prior-to-turn-off state, when the set is turned off due to noise; and (c) comparing said representative data with the representative data representing information data of the turned-off state if noise is removed, and if the compared result is the same, automatically turning on the set, while if the compared result is not the same, initializing the information data, and then awaiting a key manipulation.

BRIEF DESCRIPTION OF THE DRAWINGS

The above object of the present invention will become more apparent by describing in detail a preferred embodiment thereof with reference to the attached drawings in which.

DETAILED DESCRIPTION OF THE INVENTION

Hereinafter, the present invention will be described with reference to the accompanying drawings.

Figure 1:
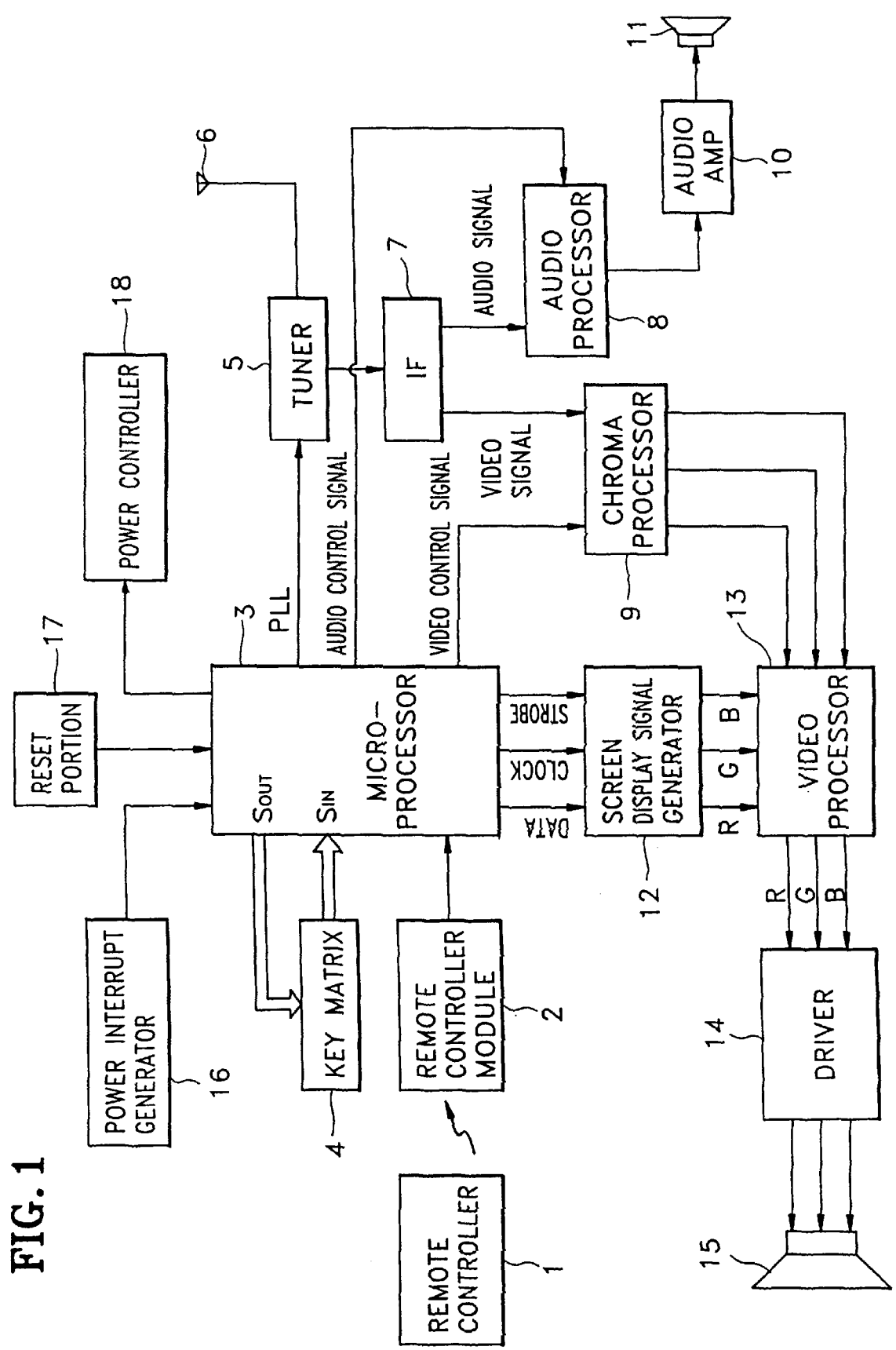
FIG. 1 is a block diagram of an apparatus according to one embodiment of the present invention.

FIG. 1 is a block diagram of an apparatus for embodying the method for automatically turning on a set turned off due to noise according to the present invention. Here, typical power (+B) and ground connections have been omitted.

A microprocessor 3 executes the various functions of an electronic product (e.g., a television) by receiving a key signal from a key matrix 4 or remote controller signal from a remote controller 1 via a remote controller module 2. If a channel is selected by a channel select key of remote controller 1 or key matrix 4, microprocessor 3 generates a phase-locked loop (PLL) signal for controlling a tuner 5 and tunes a television broadcast signal which a tuner 5 receives through an antenna 6.

The signal tuned by tuner 5 is input to an audio processor 8 and chroma processor 9 via an intermediate frequency (IF) amplifier 7. The audio signal is amplified in an audio amplifier 10 via the audio processor 8 which receives an audio control signal from microprocessor 3, and is output via a speaker 11.

Chroma processor 9 receives a video control signal output from microprocessor 3 and converts the video signal output from IF amplifier 7 into color signals R, G and B in order to input the converted color signals R, G and B to a video processor 13.

A screen display signal generator 12 receives data, clock and strobe signals from microprocessor 3 and generates color signals for on-screen display. The video processor 13 processes the television broadcast color signals and the color signals output from screen display signal generator 12 and provides the processed signals to a driver 14, so the television broadcast signals and/or on-screen display characters are displayed in a monitor 15.

Microprocessor 3 receives the interrupt signal of a power interrupt generator 16 and the reset signal of a reset portion 17, and determines whether a power supply state is normal, and controls an internal power supply by controlling a power controller 18.

Figures 2A, 2B:
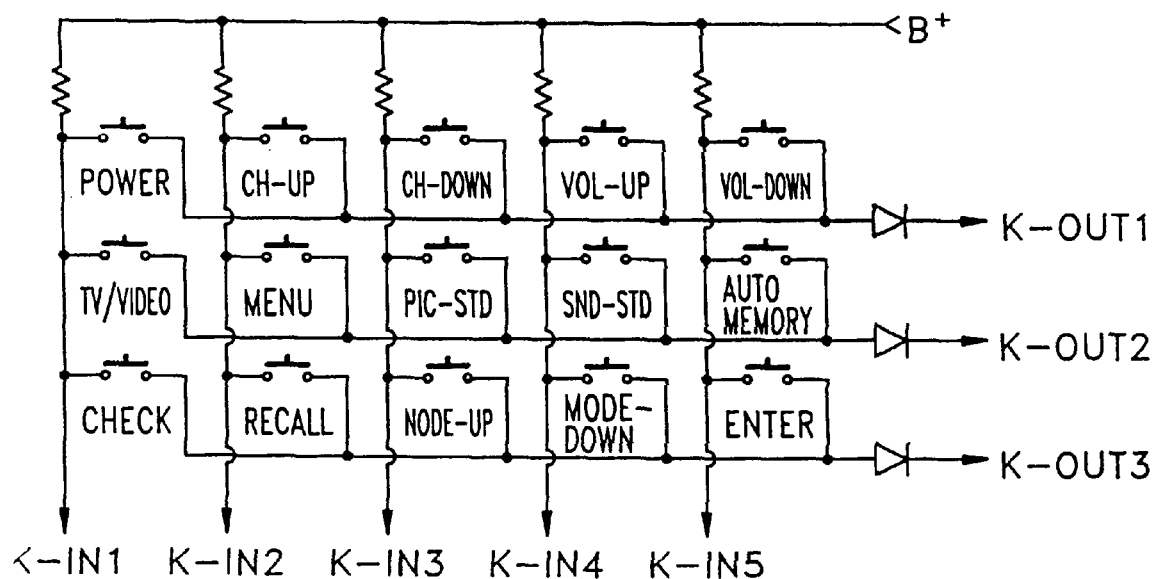
FIG. 2A is an internal circuit diagram of a remote controller device according to one embodiment of the present invention.
FIG. 2B shows a layout of a front panel of a remote controller device according to one embodiment of the present invention.

FIG. 2A is an internal circuit diagram according one embodiment of the present invention, and FIG. 2B shows a layout of a front panel of a remote controller according to one embodiment of the present invention. As shown in FIGS. 2A and 2B, the remote controller comprises a power key (POWER), a channel-up key (CH-UP), a channel-down key (CH-DOWN), a volume-up key (VOL-UP), a volume-down key (VOL-DOWN), a TV/VIDEO switch key, a menu key (MENU) for enabling programs such as picture adjustment (PICTURE), sound adjustment (SOUND), and function selection (FUNCTION) to be displayed at monitor 15 via screen display signal generator 12, an enter key (ENTER) for selecting and determining detailed program or executing a next routine, a mode-up key (MODE-UP) and mode-down key (MODE-DOWN) for selecting a desired program, and so on.

Figure 3:
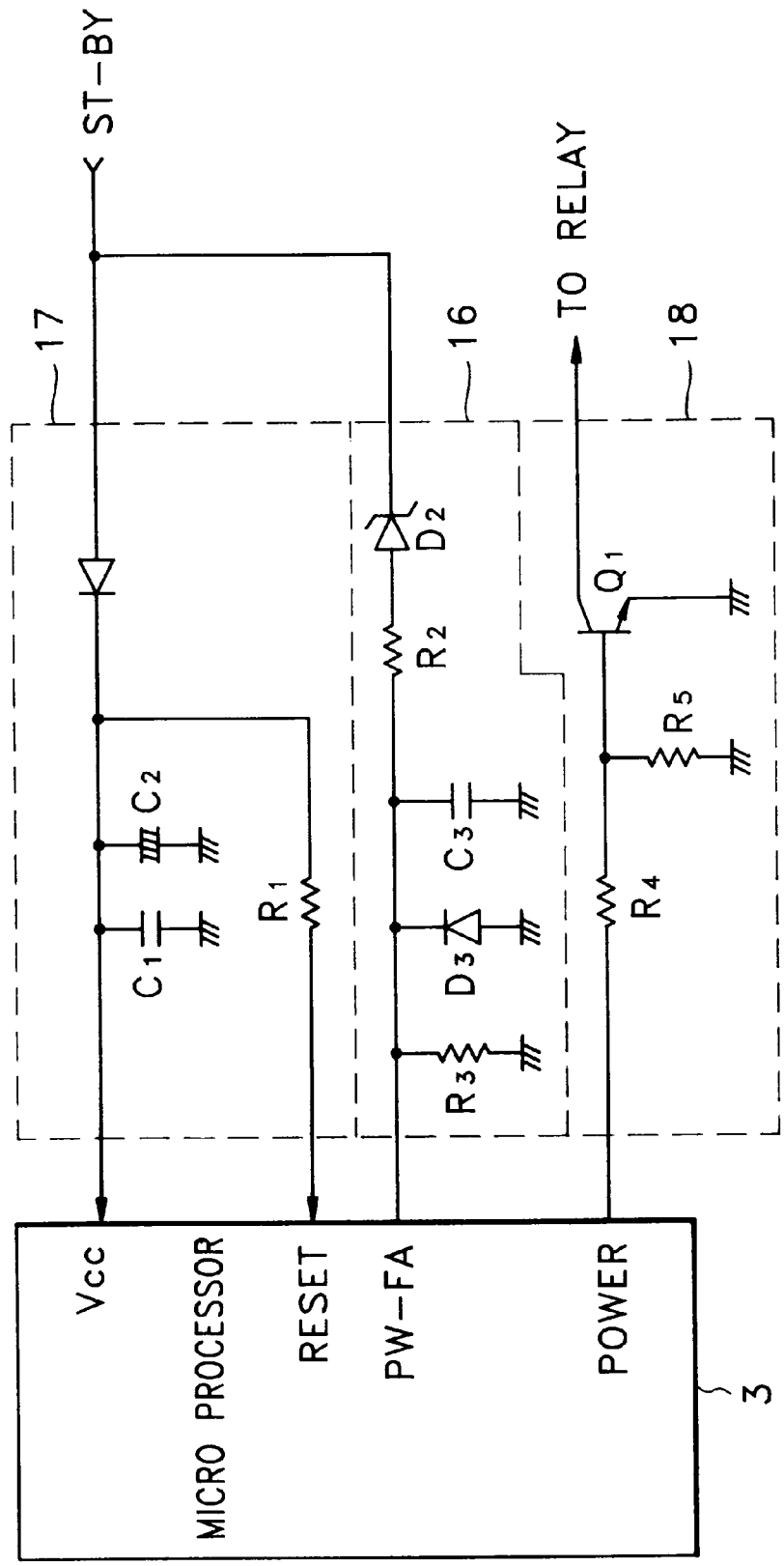
FIG. 3 is a detailed circuit diagram showing the power interrupt generator, the reset portion and the power controller shown in the FIG. 1.

FIG. 3 is a detailed circuit diagram showing the power interrupt generator 16, the reset portion 17 and the power controller 18 shown in FIG. 1.

In power interrupt generator 16, a standby voltage is applied to a power failure terminal PW-FA of microprocessor 3 via a protective capacitor C3, a zener diode D3 and a resister R3 after passing through a reverse-biased zener diode D2 and a series resister R2. If the standby voltage which is provided with the power by a power cord in the state which the power key is turned off, is lower than the level necessary to normal operation due to noise, the input of the power failure terminal PW-FA changes from "high" to "low."

In reset portion 17, the standby voltage is applied to a power terminal Vcc of microprocessor 3 via a capacitor C1 for filtering noise and a charging/discharging capacitor C2 for back-up operation, and to a reset terminal RESET of microprocessor 3 via a resister R1 in reset portion 17. In normal operation, the standby voltage is charged in charging/discharging capacitor C2 and is applied to the power terminal Vcc. On the other hand, if the standby voltage is lower than the level necessary to normal operation due to noise, the voltage charged in charging/discharging capacitor C2 is applied to the power terminal Vcc and a "low" reset signal is applied to the reset terminal RESET.

Power controller 18 comprises a transistor Q1 whose emitter is grounded and whose base is connected with a power control terminal POWER of microprocessor 3 via resisters R4 and R5. The Output of the collector turns a relay (not shown) on and off, for turning on/off the power supply. If the "high" signal is output from the power controller terminal POWER of microprocessor 3, transistor Q1 is driven to turn the relay on, thereby cutting off the power supply. If the "low" signal is output, power supply operation resumes.

Figure 4:
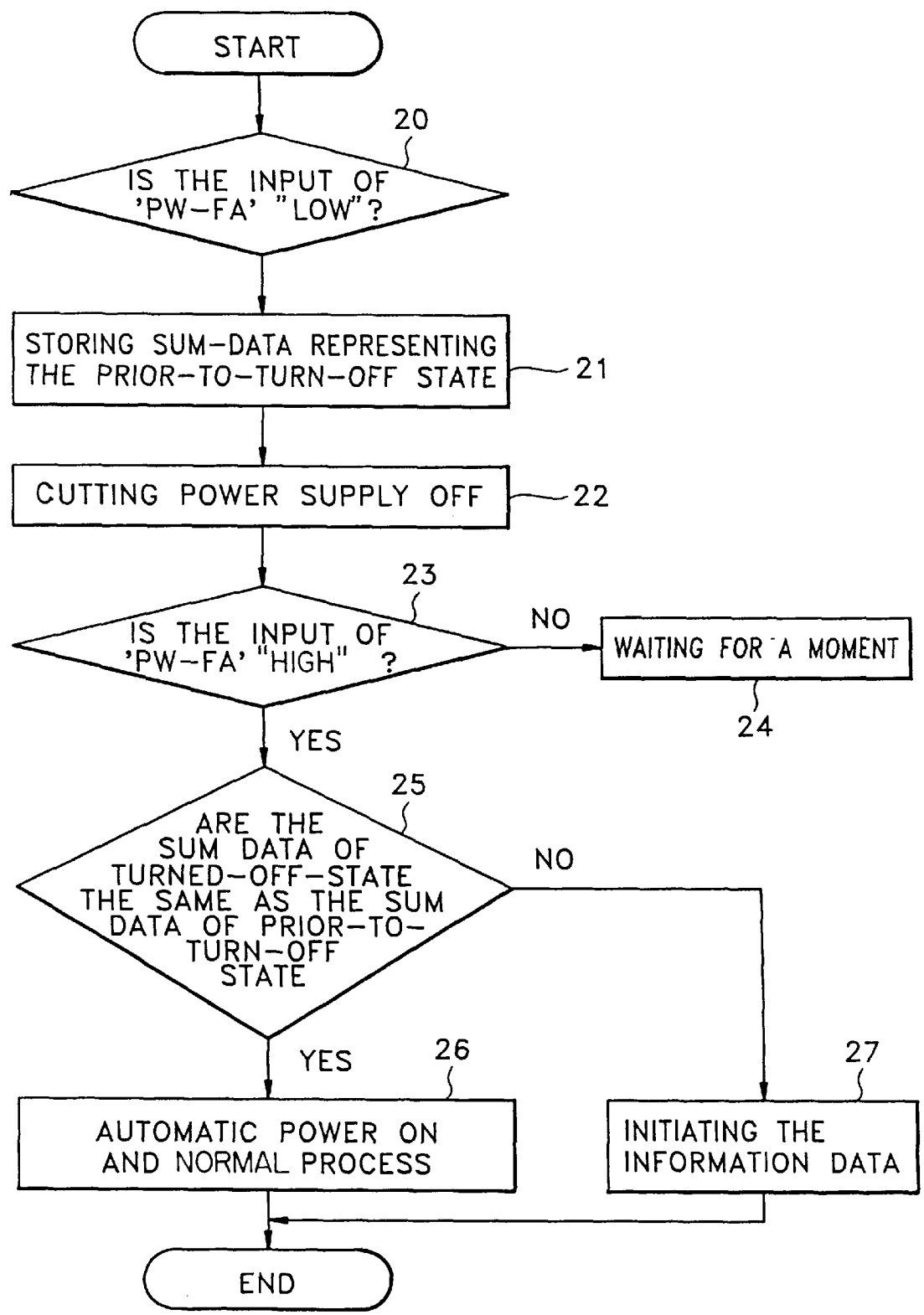
FIG. 4 is a flowchart explaining the processes of an automatic turn-on method.

FIG. 4 is a flowchart showing the operational process of the present invention.

An embodiment of the present invention will be described below with reference to FIG. 1 through FIG. 4.

In step 20, if the "low" signal is input to the power failure terminal PW-FA of microprocessor 3, it is detected that the set is turned off by static electricity or a momentary power failure. Voltage charged in capacitor C2 is applied continuously to the power terminal Vcc of microprocessor 3 and the "low" reset signal is input to the reset terminal RESET of microprocessor 3. This time, microprocessor 3 stores sum data which is representative data representing a prior-to-turn-off state, and obtained by summing the information data, for example channel, volume, contrast, etc. The sum data stored in step 21 is the sum data about information data of the prior-to-turn-off state. Also, the power control terminal POWER of microprocessor 3 outputs a "high" signal to cut off the power supply in step 22.

If the poor environmental conditions are restored to normal, that is, if the noise is removed, a "high" signal is input from power interrupt generator 16 to the power failure terminal PW-FA of microprocessor 3 in step 23. If noise is not removed and a "low" input signal is maintained, microprocessor 3 waits until a "high" signal is input in step 24. If the "high" signal is input to the power failure terminal PW-FA, microprocessor 3 compares the sum data of the turned-off state with the sum data of the prior-to-turn-off state in step 25.

If the compared result is the same, the power control terminal POWER of microprocessor 3 outputs a "low" and transistor Q1 is turned off, and power supply operation is thereby resumed. That is, the operation resumes in the same state as the prior-to-turn-off state in step 26.

If the compared result is not the same in step 25, it means that the information data has been destroyed or damaged upon turning off or that the information data has been destroyed or damaged upon turning on again after turn-off. Therefore, the information data is initialized as initial data in step 27. If the power is supplied normally by way of the user's manipulation of the power key, the channel selection, volume adjustment etc. resumes.

As described above, in electronic products such as a television using a microprocessor, the method for automatically turning on a set turned off due to noise according to the present invention, if a set is turned off because noise occurs due to static electricity or momentary power failure, determines whether information data which can be changed by a user is destroyed or damaged, and turns on in the prior-to-turn-off state or the initial state. Thus, the user does not need to turn on a set directly if the set is turned off due to noise.

What is claimed is:

1. A method for automatically turning on a set turned off due to noise, said method comprising the steps of:

(a) determining if a set is turned off due to noise;

(b) storing first data representative of a prior-to-turn-off state, when the set is turned off due to noise; and (c) comparing said first data with second data representing a turned-off state if noise is removed to produce a compared result, and if the compared result is the same, automatically turning on the set, while if the compared result is not the same, initializing said first data, and then awaiting a key manipulation.

2. A method for automatically turning on a set turned off due to noise as claimed in claim 1, wherein said determining step (a) further comprises the step of recognizing that the set is turned off due to noise if an interrupt signal generated from a power interrupt generating portion is applied.

3. A method for automatically turning on a set turned off due to noise as claimed in claim 1, wherein said storing step (b) further comprises the step of disabling a power controlling portion and cutting off a power supply by outputting a reset signal from a reset portion, if the set is turned off due to noise.

4. A method for automatically turning on a set turned off due to noise as claimed in claim 1, wherein said comparing step (c) further comprises the step of supplying power by enabling a power-controlling portion to resume operation of the same state as the prior-to-turn-off state if the compared result is the same, and initializing said first data and awaiting a key manipulation if the compared result is not the same.

5. A method of automatically turning on an electronic device which has been turned off due to noise, the method comprising the steps of:

determining if the electronic device has been turned off due to noise;

storing, if it is determined that the electronic device has been turned off, first sum data representing data information of a prior-to-turn-off state;

storing second sum data representing data information of a turned-off state;

comparing said first and second sum data, and if said first and second sum data are the same, automatically turning on the electronic device, and if said first and second sum data are not the same, then initializing the second sum data.

* * * * *